(12) United States Patent
Okano et al.

(10) Patent No.: US 6,675,871 B2
(45) Date of Patent: Jan. 13, 2004

(54) HEAT EXCHANGER, METHOD OF HEAT EXCHANGE AND VEHICLE DRIVE DEVICE HAVING HEAT EXCHANGER

(75) Inventors: Hiroshi Okano, Koga (JP); Yukito Kawakami, Koga (JP)

(73) Assignee: Seibu Giken Co., Ltd., Koga (JP)

( * ) Notice: Subject to any disclaimer, the term of this patent is extended or adjusted under 35 U.S.C. 154(b) by 28 days.

(21) Appl. No.: 09/805,445

(22) Filed: Mar. 14, 2001

(65) Prior Publication Data

US 2001/0035280 A1 Nov. 1, 2001

(51) Int. Cl.[7] ............................................... F23L 15/02
(52) U.S. Cl. .................. 165/8; 165/6; 165/10; 165/41
(58) Field of Search ............................. 165/7, 8, 9, 10, 165/DIG. 9, 16, 18, 27, 33

(56) References Cited

U.S. PATENT DOCUMENTS

| | | | | |
|---|---|---|---|---|
| 4,911,775 A | * | 3/1990 | Kuma et al. ................. | 156/208 |
| 5,183,484 A | * | 2/1993 | Yamaguchi et al. ............ | 55/34 |
| 5,435,981 A | * | 7/1995 | Ichiki et al. ............. | 423/239.1 |
| 5,701,762 A | * | 12/1997 | Akamatsu et al. ............ | 62/636 |
| 5,943,877 A | * | 8/1999 | Chen ........................... | 62/402 |
| 6,328,787 B1 | * | 12/2001 | Yamauchi .................... | 95/113 |
| 6,394,210 B2 | * | 5/2002 | Matsuda et al. ........... | 180/68.1 |

* cited by examiner

*Primary Examiner*—Henry Bennett
*Assistant Examiner*—Nihir Patel
(74) *Attorney, Agent, or Firm*—Staas & Halsey LLP

(57) ABSTRACT

A heat exchanger includes a honeycomb rotor, a drive unit and a gas movement device. The honeycomb rotor has at least two heat exchange passages and at least two purge zones provided respectively between the at least two heat exchange passages. The drive unit rotates the honeycomb rotor. The gas movement device circulates a gas through the at least two purge zones. The gas movement device may include a blower, and the drive unit may include a motor. In this case rotation of the blower can be synchronized with rotation of the motor. A vehicle drive device includes a power source that emits exhaust gas. The power source has a fuel battery having an air intake. Heat may be exchanged between the exhaust gas and air supplied to the air intake.

29 Claims, 2 Drawing Sheets

HEAT EXCHANGER, METHOD OF HEAT EXCHANGE AND VEHICLE DRIVE DEVICE HAVING HEAT EXCHANGER

CROSS REFERENCE TO RELATED APPLICATIONS

This application is based on and hereby claims priority to Japanese Application No. 2000-69606 filed on Mar. 14, 2000 in Japan, the contents of which are hereby incorporated by reference.

BACKGROUND OF THE INVENTION

1. Field of the Invention

The present invention relates to equipment used for exchanging sensible heat, latent heat, or total heat energy between plural fluid streams.

2. Description of the Related Art

Heat exchangers are classified into roughly two categories; those in which the heat exchange medium does not move and those in which the heat exchange medium moves.

Heat exchangers that move the heat exchange medium generally exchange heat efficiently. However, they also have a complicated structure.

One example of a movable heat exchange medium is a honeycomb rotor, in which the rotor has small passages that resemble the nest of a bee. The honeycomb rotor is cylinder shaped. For this device, gas is passed through the honeycomb rotor as it rotates.

A heat exchanger using a honeycomb rotor will exchange sensible heat if the sheet material forming the honeycomb rotor does not have water adsorption properties. The same heat exchanger will serve as a latent heat or total heat exchanger, if the sheet material carries a moisture adsorbing agent thereon.

Heat exchangers that use a honeycomb rotor have the problem that gas remains in the small channels of the honeycomb rotor as it rotates between the hot and cold fluids. Some of the retained gas from one zone is the released in the other zone. Therefore, when performing heat exchange between different kinds of gases, there may be some mixing of the different kinds of gases.

When this problem is serious, a purge zone may be provided to drive out gas remaining in the small channels of the honeycomb rotor. Within the purge zone a fluid is passed through the honeycomb rotor to expel gas retained within the rotor.

However, there is a problem associated with processing the gas which comes out of the purge zone. The gas which comes out of the purge zone is a mixture of gases. Previously, there were two ways of treating the purged and mixed gas: by discharging it into the atmosphere or by returning the gas mixture to one of the gas streams, which gas stream can tolerate having another gas mixed therein.

Both solutions have problems. In the former, the method of treatment is often not available because the purged and mixed gas may not be acceptable for discharge into the atmosphere for health or environmental reasons. Furthermore, even if discharge is acceptable, it detracts from heat exchange efficiency. The latter method of treatment is often not ideal because often neither of the gas streams can tolerate having another gas mixed therein.

SUMMARY OF THE INVENTION

In response to the difficulties discussed above and problems encountered in the prior art, a new heat exchanger, method of heat exchange and vehicle drive device having heat exchanger have been invented. The heat exchanger includes a honeycomb rotor, a drive unit and a gas movement device. The honeycomb rotor has at least two heat exchange passages and at least two purge zones provided respectively between the at least two heat exchange passages. The drive unit rotates the honeycomb rotor. The gas movement device circulates a gas through the at least two purge zones.

The gas movement device may include a blower, and the drive unit may include a motor. In this case rotation of the blower can be synchronized with rotation of the motor. Specifically, rotation of the blower can be synchronized with rotation of the motor by supplying the blower and the motor with power from a common inverter.

An adsorbent, such as a zeolite or a silica gel may be carried on the honeycomb rotor. The honeycomb rotor may be formed of alternately laminated flat and corrugated sheets.

The vehicle drive device having a heat exchanger includes a power source, a honeycomb rotor, a drive unit and a gas movement device. The power source emits exhaust gas and employs a fuel battery having an air intake. The honeycomb rotor has at least two heat exchange passages, with the exhaust gas being directed through a first of the heat exchange passages and inlet air being directed though a second of the heat exchange passages prior to being sent to the air intake of the fuel battery. The honeycomb rotor also has at least two purge zones provided respectively between the at least two heat exchange passages. The drive unit rotates the honeycomb rotor. The gas movement device circulates a gas through the at least two purge zones.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
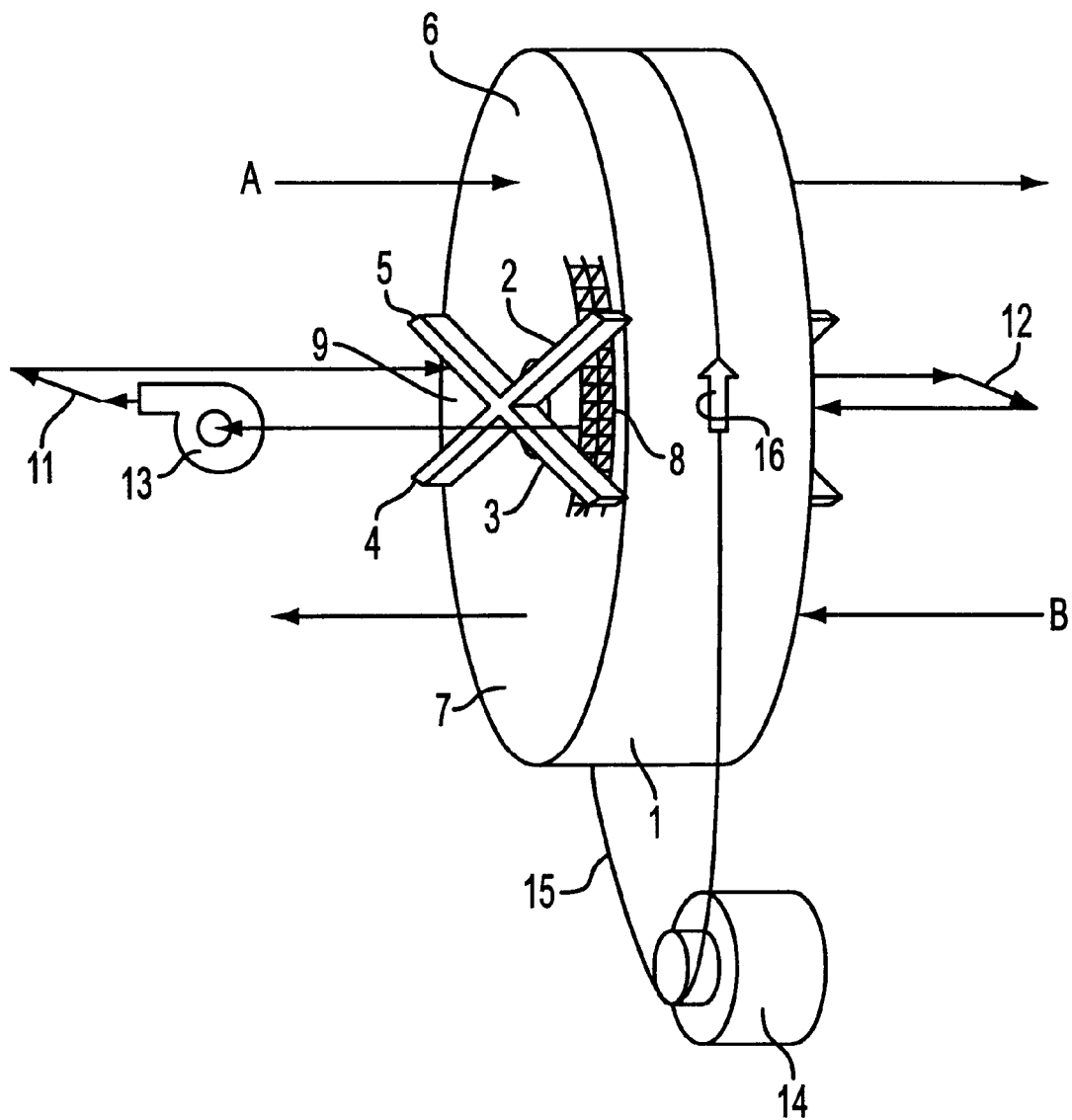
FIG. 1 is the perspective diagram showing a first embodiment of heat exchange equipment of the present invention.

Reference will now be made in detail to the preferred embodiments of the present invention, examples of which are illustrated in the accompanying drawings, wherein like reference numerals refer to like elements throughout.

FIG. 1 is the perspective diagram showing a first embodiment of heat exchange equipment of the present invention. A honeycomb rotor 1 including honeycomb shaped chambers, is made of laminated aluminum sheets, for example. Corrugated sheets may be alternately laminated with flat sheets to form small channels. A moisture adsorbing agent, such as silica gel particles or zeolite, may be formed on the surfaces of the sheets.

Four seals 2, 3, 4 and 5 divide the honeycomb rotor 1 into a first passage 6, a second passage 7, a first purge zone 8, and a second purge zone 9. According to one embodiment, the central angle of the first passage 6 is the same as that of the second passage 7, and the central angle of the first purge zone 8 is the same as that of the second purge zone 9. Seals with the same shapes and analogous positions as seals 2, 3, 4, and 5 are arranged on the opposite side of the honeycomb rotor 1. The seals corresponding to seals 2 and 3 are partially visible in FIG. 1.

As the honeycomb rotor 1 turns, it rotates through the passages and zones formed by the seals 2, 3, 4 and 5 on the front side and the seals on the back side. That is, the rotor 1 rotates with respect to the seals.

Also shown in FIG. 1 are paths 11, 12 representing conduits. The outlet of the first purge zone 8 and the inlet of the second purge zone 9 are connected by path/conduit 11. The outlet of the second purge zone 9 and the inlet of the first purge zone 8 are connected by path/conduit 12. Together, paths/conduits 11 and 12, the second purge zone 9, and the first purge zone 8 constitute an annular structure through which fluid is circulated. A blower 13, which is perhaps arranged in the middle of path/conduit 11 circulates air through the annular structure and the zones 8, 9. The blower 13, together with the paths/conduits 11 and 12, serves as a gas movement device.

A geared motor 14 rotates the honeycomb rotor 1 through a belt 15. The geared motor 14 rotates the honeycomb rotor 1 in the direction of arrow 16. The geared motor 14 and the belt 15 together serve as a drive unit.

The action of the heat exchanger in the case where a cold and dry gas A passes through the first passage 6 and a hot and highly humid gas B passes through the second passage 7 will now be explained. The moisture contained in the hot and highly humid gas B is adsorbed on the honeycomb rotor 1, within the second passage 7. Simultaneously, the honeycomb rotor 1 is warmed. Conversely, gas B loses humidity and is cooled within the second passage 7 of the honeycomb rotor 1.

Humidity adsorbed on the honeycomb rotor 1 is desorbed by cool and dry gas A in the first passage 6 and the honeycomb rotor 1 is cooled. Conversely, gas A is humidified and warmed by the honeycomb rotor 1. In this way sensible heat and latent heat are exchanged between gas B and gas A.

The operation of the first and second purge zones 8, 9 will now be explained. First, immediately after small channels of the honeycomb rotor 1 pass seal 7 on the front side and the corresponding seal on the back side (passes the second passage 7), gas B remains in the small channels of the honeycomb rotor 1. Blower 13 then sucks gas B out of the first purge zone 8 and sends gas B through path/conduit 11 and into the second purge zone 9. With further rotation of the honeycomb rotor 1, gas B in the second purge zone 9 moves to the second passage 7 where it is mixed into the flow of gas B.

Immediately after small channels of the honeycomb rotor 1 rotate past seal 5 on the front side and the corresponding seal on the back side (passes the first passage 6), gas A remains in the small channels of the honeycomb rotor 1. Blower 13 then drives gas A out of the second purge zone 9 and sends gas A through path/conduit 12 and into the first purge zone 8. With further rotation of the honeycomb rotor 1, gas A in the first purge zone 8 moves to the first passage 6 where it is mixed into the flow of gas A.

As described above, it may be desirable for gas A flowing in the first passage 6 and gas B flowing in the second passage 7 to not be mixed. In order to prevent the mixing of the gas A flowing in the first passage 6 with the gas B flowing in the second passage 7, it may be preferable to set the flow velocity of the blower 13 so that it is sufficient for gas to emerge from the first purge zone 8 and from the second purge zone 9 during the time that it takes the honeycomb rotor 1 to rotate one half of a rotation. That is, gas should be able to move from the inlet of one of the purge zones 8, 9, to move through one of the paths/conduits 11, 12 and to arrive at the inlet of the other purge zone 9, 8 in the time it takes an incremental part of the honeycomb rotor 1, which is located between one set of seals 2, 3 or 4, 5, to rotate and become located between the other set of seals 4, 5 or 2, 3. If the rotor rotates at a rate of n rpm, it takes $t_1$ seconds for the rotor to rotate one half a turn, where $$t_1 = \frac{1}{n} \cdot \frac{1}{2} \cdot 60 \text{ seconds}$$

On the other hand, if blower 30 moves gas at a velocity v, and the length of one of the paths/conduits 11, 12 is L, then it takes a time $t_2$ for gas to travel from one of the purge zones 8, 9 to the other of the purge zones 9, 8, where $$t_2 = L/v$$

Although in the above embodiment the central angle of the first purge zone 8 equals the central angle of the second purge zone 9, it is not necessary to make the central angles equal.

In order to change the flow rate or the heat exchange efficiency between gases, the rotational frequency of the honeycomb rotor 1 may be varied. In order to maintain the speed of the blower 13 relative to the speed of the honeycomb rotor 1, it is preferable to synchronize the blower 13 with the geared motor 14 by using a common inverter as a power source. Using a common inverter is ideal because when the rotational frequency of the honeycomb rotor 1 increases, the volume of gas discharged from the blower 13 increases at a proportional rate. When the rotational frequency of the honeycomb rotor 1 decreases, the volume of air discharged from the blower 13 decreases at a proportional rate.

As mentioned above, a geared motor may be used to rotate the honeycomb rotor 1. The geared motor 14 may be a synchronous motor 14 having a stator and a rotor, with rotation of the rotor being synchronized with an AC frequency. When both the geared motor 14 and the blower 13 are supplied with power from a common inverter, the rotation of the geared motor 14 will be synchronized with that of the blower 13. Generally, the blower 13 is powered with three phase electric current, and the geared motor 14 is powered with single phase electric current. In this case, to allow use of a single inverter, the geared motor 14 can be powered by one of the three phases supplied to the blower 13.

Figure 2:
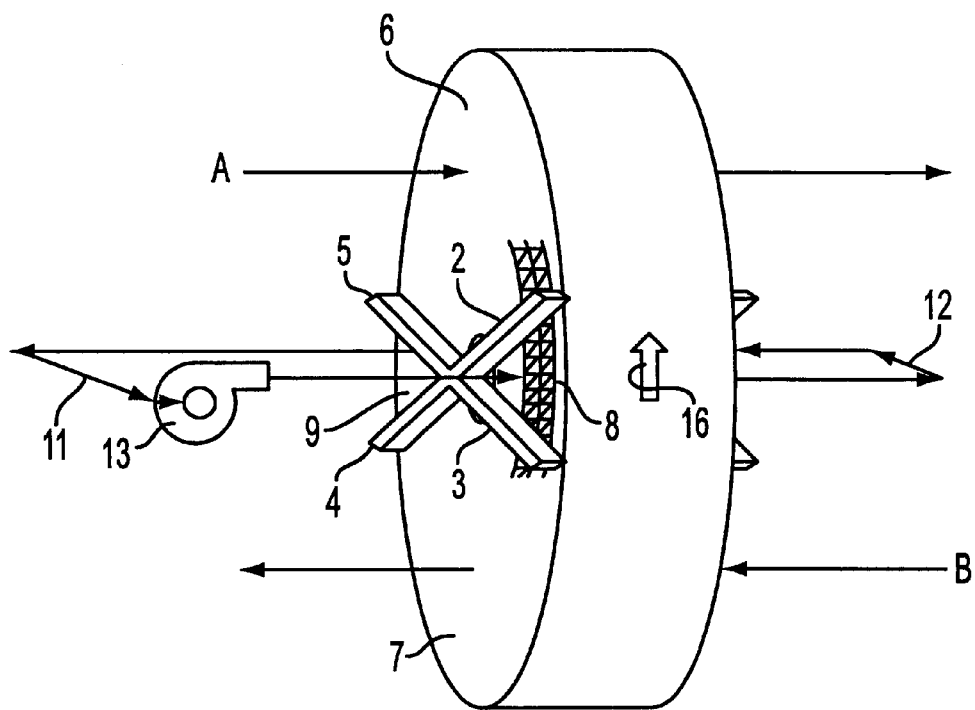
FIG. 2 is the perspective diagram showing a second embodiment of heat exchange equipment of the present invention.

FIG. 2 is the perspective diagram showing a second embodiment of the heat exchange equipment of the present invention. The difference of this second embodiment from the first embodiment is that the direction of the blower 13 is reversed. That is, in the second embodiment, the flow of the purge gas in the paths/conduits 11 and 12 is in the opposite direction to that of the first embodiment.

Figure 3:
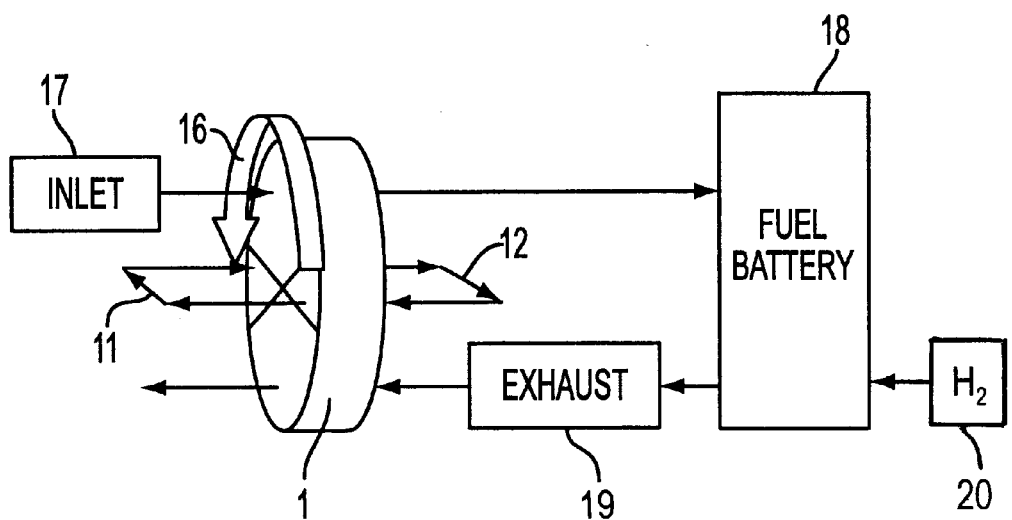
FIG. 3 is a perspective schematic view of an exemplary application for the heat exchange equipment shown in FIGS. 1 and 2.

FIG. 3 is a perspective schematic view of an exemplary application for the heat exchange equipment shown in FIGS. 1 and 2. In FIG. 3, heat is exchanged between inlet air 17 supplied to a fuel battery 18 and exhaust gas 19. For example, the fuel battery 18 may be an automobile fuel battery. Such fuel batteries 18 use hydrogen 20 as a fuel, which is oxidized with oxygen contained in the inlet air 17. The oxidation generates electricity and produces water vapor as the exhaust 19. To improve efficiency, the air fed to the fuel battery 18 should be warm and rich in both oxygen and moisture. The exhaust gas 19 discharged by the fuel battery 18 is hot and rich in moisture, but oxygen deficient. With the configuration shown in FIG. 3, the honeycomb rotor 1 can exchange heat between the hot exhaust gas 19 and the cool inlet air 17. Also, moisture from the exhaust gas 19 can be adsorbed on the honeycomb rotor 1 and desorbed by the inlet air 17. The additional moisture may increase the efficiency of the fuel battery 18.

Because of the different oxygen concentrations, it is important that mixing between the exhaust gas 19 and the inlet air 17 be minimized. The present invention enables this to occur.

Although the above embodiments describe the honeycomb rotor 1 as containing a moisture adsorbing agent, it is possible to perform sensible-heat exchange between gas A and gas B using a honeycomb rotor that contains no moisture adsorbing agent.

Furthermore, heat exchanger examples were given for exchanging heat between gases such as gas A and gas B. However, the invention can be used to exchange heat between any gases, such as between nitrogen or hydrogen.

Even if heat exchange is performed between different kinds of gases, the amount of gas mixing is very small. That is, because the heat exchange equipment of the present invention is constructed as described above, when the heat exchange equipment performs heat exchange between the gases flowing in plural passages, the mutual mixing of the gases flowing in each passage can be made extremely small. Furthermore, the heat exchange equipment of the present invention minimizes mixing of the gases while maintaining a high heat exchange efficiency.

Moreover, the passages and the charge zones of the heat exchanger of the present invention may be completely sealed so that gases are not emitted. With sealing, the gases flowing through the passages are not discharged to the atmosphere. Therefore, the heat exchanger can exchange heat between gases for which discharge to the atmosphere is undesirable.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A heat exchanger comprising:
   a honeycomb rotor having at least two heat exchange passages and at least two purge zones provided respectively between the at least two heat exchange passages;
   a drive unit to rotate the honeycomb rotor; and
   a gas movement device to repeatedly exchange a same gas through and between the at least two purge zones.

2. A heat exchanger according to claim 1, wherein
   the gas movement device comprises a blower,
   the drive unit comprises a motor, and
   rotation of the blower is synchronized with rotation of the motor.

3. A heat exchanger according to claim 2, wherein the blower of the gas movement device and the motor of the drive unit are supplied with power from a common inverter.

4. A heat exchanger according to claim 1, wherein the honeycomb rotor carries an adsorbent thereon.

5. A heat exchanger according to claim 4, wherein the adsorbent is a zeolite.

6. A heat exchanger according to claim 4, wherein the adsorbent is a silica gel.

7. A heat exchanger according to claim 1, wherein the honeycomb rotor is formed of alternately laminated flat and corrugated sheets.

8. A vehicle drive device having a heat exchanger, comprising:
   a power source emitting exhaust gas and comprising a fuel battery having an air intake;
   a honeycomb rotor comprising:
      at least two heat exchange passages, with the exhaust gas being directed through a first of the heat exchange passages and inlet air being directed though a second of the heat exchange passages prior to being sent to the air intake of the fuel battery; and
      at least two purge zones provided respectively between the at least two heat exchange passages;
   a drive unit to rotate the honeycomb rotor; and
   a gas movement device to circulate a gas through and between the at least two purge zones.

9. A vehicle drive device according to claim 8, wherein
   the gas movement device comprises a blower,
   the drive unit comprises a motor, and
   rotation of the blower is synchronized with rotation of the motor.

10. A vehicle drive device according to claim 9, wherein the blower of the gas movement device and the motor of the drive unit are supplied with power from a common inverter.

11. A vehicle drive device according to claim 8, wherein the honeycomb rotor carries an adsorbent thereon.

12. A vehicle drive device according to claim 11, wherein the adsorbent is a zeolite.

13. A vehicle drive device according to claim 11, wherein the adsorbent is a silica gel.

14. A vehicle drive device according to claim 8, wherein the honeycomb rotor is formed of alternately laminated flat and corrugated sheets.

15. A method of exchanging heat, comprising:
   rotating a honeycomb rotor having at least two heat exchange passages and at least two purge zones provided respectively between the at least two heat exchange passages; and
   circulating a gas through directly between the at least two purge zones.

16. A method of exchanging heat according to claim 15, wherein
   the gas movement device comprises a blower,
   the drive unit comprises a motor, and
   the method further comprises synchronizing rotation of the blower with rotation of the motor.

17. A method of exchanging heat according to claim 16, wherein rotation of the blower is synchronized with rotation of the motor by supplying the blower and the motor with power from a common inverter.

18. A method of exchanging heat according to claim 16, wherein the honeycomb rotor is formed of alternately laminated flat and corrugated sheets.

19. A method of exchanging heat according to claim 16, wherein the honeycomb rotor carries an adsorbent thereon.

20. A heat exchanger according to claim 1, wherein a unit of the gas, having been purged from a first location of the rotor as the first location rotated through a first of the purge zones, circulates and enters a second of the purge zones as the first location rotates through the second of the purge zones.

21. A heat exchanger according to claim 2, wherein the blower and the motor are synchronized such that a unit of gas exiting a first of the purge zones circulates and enters a second of the purge zones in the time that it takes the rotor to turn one half of a rotation.

22. An apparatus, comprising:
   a rotating honeycomb rotor comprising a first side and a second side;
   a first purge zone through which the rotor rotates;
   a second purge zone through which the rotor rotates;
   a first path connecting the first purge zone on the first side of the rotor with the second purge zone on the second side of the rotor;
   a second path connecting the first purge zone on the second side of the rotor with the second purge zone on the second side of the rotor; and
   a gas movement device causing gaseous flow through the paths and the purge zones, where a first gas flows out of the first purge zone, through the first path, and into the second purge zone, and where a second gas flows out of the second purge zone, through the second path, and into the first purge zone.

23. An apparatus, comprising:
   a rotor, with a first side and a second side, rotating through a first purge zone, a first passage, a second purge zone, and a second passage, where the purge zones are arranged between the passages, and the passages are arranged between the purge zones;
   a rotor, with a first side and a second side, rotating through a first purge zone and a second purge zone;
   a first path connecting the first purge zone of the first side with the second purge zone on the first side, where a first type gas flows out of the first purge zone and through the first path, and while the first type of gas is in the first path it is separate from a second type of gas; and
   a second path connecting the first purge zone of the second side with the second purge zone on the second side, where the second type gas flows out of the second purge zone and through the second path, and while the second type of gas is in the second path it is separate from the first type of gas.

24. An apparatus, comprising:
   a rotating rotor comprised of cells passing through sides of the rotor;
   a first purge zone followed by a first passage followed by a second purge zone followed by a second passage;
   a cell containing a first portion of a first type of gas enters the first passage, and while rotating through the first passage a second portion of the first type of gas is received from an external source and replaces the first portion of the first type of gas;
   the cell containing the second portion of the first type of gas enters the first purge zone, and while rotating through the first purge zone the cell receives a first portion of a second type of gas which replaces the second portion of the first type of gas; and
   the cell containing the first portion of the second type of gas enters the second passage, and while rotating through the second passage the cell receives a second portion of the second type of gas which replaces the first portion of the second type of gas.

25. A rotating honeycomb rotor receiving a first gas at a first zone and receiving a second gas at a second zone, and exchanging heat between the two gases without mingling the two gases.

26. A heat exchange apparatus, comprising:
   a rotating rotor;
   a first heat exchange zone through which a first gas flows and through which the rotor rotates, where the flowing first gas replaces portions of the first gas that have been cooled or warmed by the rotor; and
   a second heat exchange zone through which a second gas flows and through which the rotor rotates, where the flowing second gas replaces portions of the second gas that have been cooled or warmed by the rotor; and
   a first purge zone through which the rotor rotates, where portions of the second gas received from a second purge zone replace portions of the first gas.

27. A heat exchange apparatus, comprising:
   a rotating rotor;
   a first purge zone within which a first gas from a second purge zone displaces a second gas as the rotor rotates through the first purge zone; and
   a second purge zone within which a second gas from the first purge zone displaces the first gas as the rotor rotates through the second purge zone.

28. A method of exchanging heat between gases, comprising:
   purging a portion of a first gas from a portion of a rotor in a first purge zone;
   rotating the portion of the rotor into a heat exchange passage through which a second gas flows, thereby filling the portion of the rotor with a portion of the second gas; and
   rotating the portion of the rotor into a second purge zone, where the purged portion of first gas replaces the portion of the second gas in the portion of the rotor.

29. A method of exchanging heat between gases, comprising:
   replacing a portion of a first gas in a portion of a rotor in a first purge zone with a first portion of a second gas received from a second purge zone;
   rotating the portion of the rotor into a first heat exchange passage through which the second gas flows, thereby replacing the first portion of the second gas in the portion of the rotor with a second portion of the second gas;
   rotating the portion of the rotor into the second purge zone, where the purged portion of first gas replaces the second portion of the second gas in the portion of the rotor; and
   rotating the portion of the rotor into a second heat exchange passage, through which the first gas flows, thereby replacing the portion of the first gas with a new portion of the first gas.

* * * * *